(12) United States Patent
Kaleja et al.

(10) Patent No.: US 7,546,493 B2
(45) Date of Patent: Jun. 9, 2009

(54) METHOD FOR RESPONDING TO ERRORS OCCURRING DURING OPERATION OF A NETWORKED MEDICAL SYSTEM

(75) Inventors: Stefan Kaleja, Erlangen (DE); Emilian Ertel, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 446 days.

(21) Appl. No.: 11/413,335

(22) Filed: Apr. 28, 2006

(65) Prior Publication Data

US 2007/0294603 A1 Dec. 20, 2007

(51) Int. Cl.
*G06F 11/00* (2006.01)
(52) U.S. Cl. .................. 714/57; 714/40; 714/48
(58) Field of Classification Search .......... 714/57
See application file for complete search history.

(56) References Cited

U.S. PATENT DOCUMENTS

| | | | | |
|---|---|---|---|---|
| 5,715,386 A * | 2/1998 | Fulton et al. | | 714/38 |
| 6,453,430 B1 * | 9/2002 | Singh et al. | | 714/47 |
| 6,634,001 B2 * | 10/2003 | Anderson et al. | | 714/38 |
| 6,742,141 B1 * | 5/2004 | Miller | | 714/26 |
| 6,898,553 B2 * | 5/2005 | Minucciani et al. | | 702/182 |
| 7,249,283 B2 * | 7/2007 | Platteter | | 714/25 |
| 7,313,736 B2 * | 12/2007 | Scrandis et al. | | 714/47 |
| 7,383,474 B2 * | 6/2008 | Sekizawa | | 714/57 |
| 2003/0009711 A1 * | 1/2003 | Kuhn et al. | | 714/57 |
| 2003/0159133 A1 * | 8/2003 | Ferri et al. | | 717/130 |
| 2004/0033799 A1 * | 2/2004 | Fontius | | 455/423 |
| 2004/0078734 A1 * | 4/2004 | Deuter | | 714/57 |
| 2005/0021293 A1 * | 1/2005 | Elbel et al. | | 702/183 |
| 2006/0288199 A1 * | 12/2006 | Ertel et al. | | 713/1 |
| 2007/0002730 A1 * | 1/2007 | Lu et al. | | 370/216 |
| 2007/0245174 A1 * | 10/2007 | Gale et al. | | 714/57 |

OTHER PUBLICATIONS

Printout of PowerPoint Presentation for HP OpenView Application Management.

* cited by examiner

*Primary Examiner*—Scott T. Baderman
*Assistant Examiner*—Loan Truong
(74) *Attorney, Agent, or Firm*—Schiff Hardin LLP

(57) ABSTRACT

In a method for responding to errors that occur during operation of a medical system, having a number of computer workstations connected via a network, upon failure of a system component that is necessary for proper operation of a system program, while the system program is running on one of workstations, a display is presented at the workstation that indicates at the workstation which portions of the system program can still be used, and which portions of the system program can no longer be used due to malfunctioning of the component. Via the network, an automatic notification is transmitted to a workstation associated with a person who is responsible for correcting the malfunctioning component.

7 Claims, 3 Drawing Sheets

METHOD FOR RESPONDING TO ERRORS OCCURRING DURING OPERATION OF A NETWORKED MEDICAL SYSTEM

BACKGROUND OF THE INVENTION

1. Field of the Invention

The present invention relates to a computerized networked medical system, and in particular to a method for monitoring and reporting errors occurring in the operation of the system.

2. Description of the Prior Art

Conventionally, the status of a complex networked medical system is determined as an aggregate of the status of a number of sub-components of the system (sub-routines of a computer program) and is displayed to the user at a workstation within the system as an overall status. Typically colors are used to indicate the status, with displayed information or icons in red indicating an error, displayed information or icons in yellow indicating a warning, and displayed information or icons displayed in green indicating an operational (OK) status. The sub-components can be individual processes, particular applications, with each application being composed of a number of processes, hardware components and service routines. These sub-components can be logically (hierarchically) grouped in order to allow them to be more easily surveyed in total by an administrator or a service technician.

An example of the type of system display that can be conventionally presented is shown in FIG. 1. Typically, if an error or malfunction occurs anywhere within the system, the entirety of the displayed information is presented in red. A problem that exists in this conventional approach that in highly complex systems for example a PACS, the failure of one sub-component does not necessarily mean that the overall system is non-operational. For example, a failure of an automatic software distributor does not necessarily preclude the service of the system to undertake a diagnostic medical finding based on imaging data or other information acquired via a medical imaging modality. Recognition of this fact, however, requires a relatively detailed knowledge of the overall system of operation, which is normally not possessed by the average user of such a system.

In the example of the system architecture shown in FIG. 1, the displayed information may be presented in red, indicating a faulty status, because the status of the sub-component "system service" is faulty. From this displayed representation, a user cannot determine the effect that the failure (inoperativeness) of the "system service" sub-component has on the overall system, and which other sub-component (use cases) are unable to be executed and which sub-components are still functional. Only an experienced user who can proceed through a relatively elaborate or complicated diagnostic routine can make such a conclusion. The average system user normally cannot recognize these dependencies, or lack of dependencies.

SUMMARY OF THE INVENTION

It is an object of the present invention to provide a method for responding to errors that occur during the operation of a medical system that allows a user, who does not have detailed knowledge of the overall system, to be informed as to what the user can still do at his own computerized workstation, and what the user cannot do at that workstation, in the event of a malfunction of one of the system components.

The above object is achieved in accordance with the present invention in a method for responding to errors occurring during operation of a medical system, wherein the medical system includes a number of computerized workstations in communication with a network, that includes the initial step, at one of the computerized workstations, running a system program that is dependent on the proper functioning of a number of components at the workstation. The components can be software components and/or hardware components. Upon the occurrence of an inability of one of the components to function properly, the user at the workstation can learn of this malfunctioning either by immediate display of malfunction-indicating information at the workstation, or by the user executing a small number of easy steps at the workstation. Upon such an occurrence, the user is automatically permitted at the workstation to continue implementing all portions of the program that are not influenced by the malfunctioning component. Additionally, a notification is immediately supplied, via the network, to at least one other workstation in the system of the occurrence of the malfunctioning component.

The user is thus not presented with an indication of an overall system failure, but is informed only of the failure of the relevant component, and all other components that are not affected by this failure can still be executed by the user at his or her workstation. The notification to at least one other workstation via the network can be a general notification to all users at all workstations in communication with the network, or may be a targeted notification to only users who are will be effected by the malfunction, or to users who have the responsibility for correcting the malfunction, such as a service technician.

DESCRIPTION OF THE PREFERRED EMBODIMENTS

In accordance with the inventive method, when an error occurs in a component, such as a software component or a hardware component, of an overall system, such as a networked computerized medical system, an automatic adjustment is made at the workstation of a particular user, or at another appropriate location within the system, of which components can still be operated effectively, despite the occurrence of the malfunction, and which components cannot be operated effectively due to the malfunction. The determination can be made by executing an algorithm that determines the influence on or dependency of other system components on the individual work steps that a user is executing at his or her workstation, based on an analysis of those individual work steps. Alternatively, the determination can be made by making a prognosis (estimation) that the correction of the failed component will have on the individual work steps. Another alternative is to make the determination as a prognosis as to when, starting from the point-in-time at which the failure occurred, until a total failure of that component or other components will occur.

In contrast to the conventional approach, the overall status of the system is not displayed to the user, but instead only the feasibility of the primary use cases of the system are shown. These are the normally-executed routines and sub-routines available at a particular workstation. They may vary dependent on whether the workstation is being used, for example, by a radiologist, a diagnostician, or a system Administrator. Only primary use cases that no longer can be executed by the user are indicated as "failed" by some type of appropriate designation at the user's display. Moreover, as soon as this occurs, any other user in the system (i.e., the workstation of such users) is automatically notified of the failure via the network.

Figure 1:
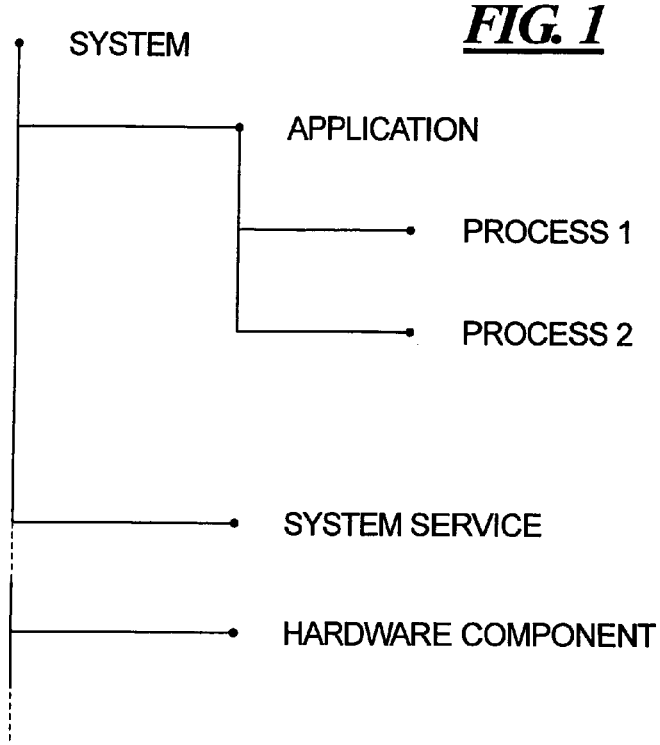
FIG. 1, as noted above, illustrates a typical display of a hierarchically organized system at a workstation within the system.
Figure 2:
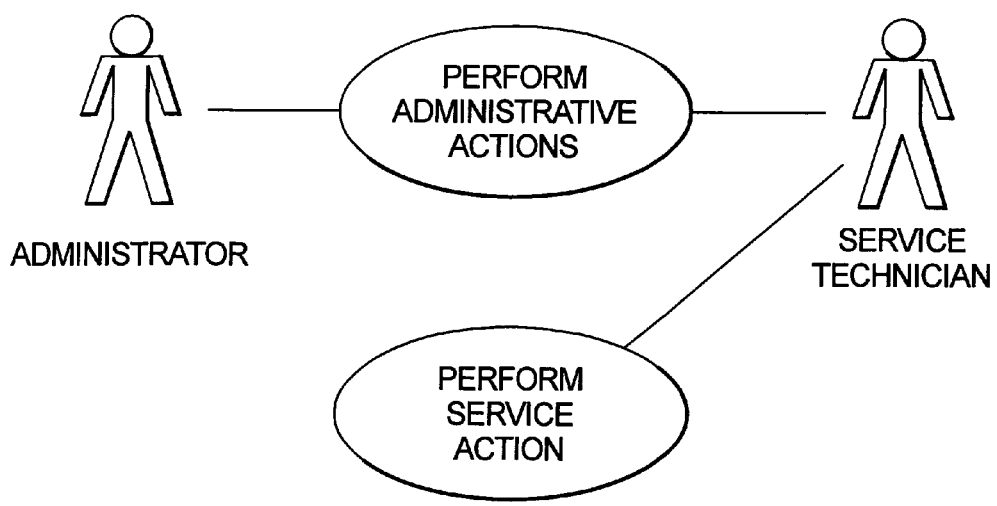
FIG. 2 schematically illustrates the effect of the inventive method for allowing a system user to continue with a particular task.

In the example shown in FIG. 2, it is assumed that the networked system provides the application case "perform administrative actions" as well as the separate application case "perform service action." It is assumed that the application case "performed service action" no longer functions properly, and therefore the service engineer is immediately alerted and service actions I the system are not possible. The administrator, however, can proceed with his or her authorized functions in an unhindered manner.

Figure 3:
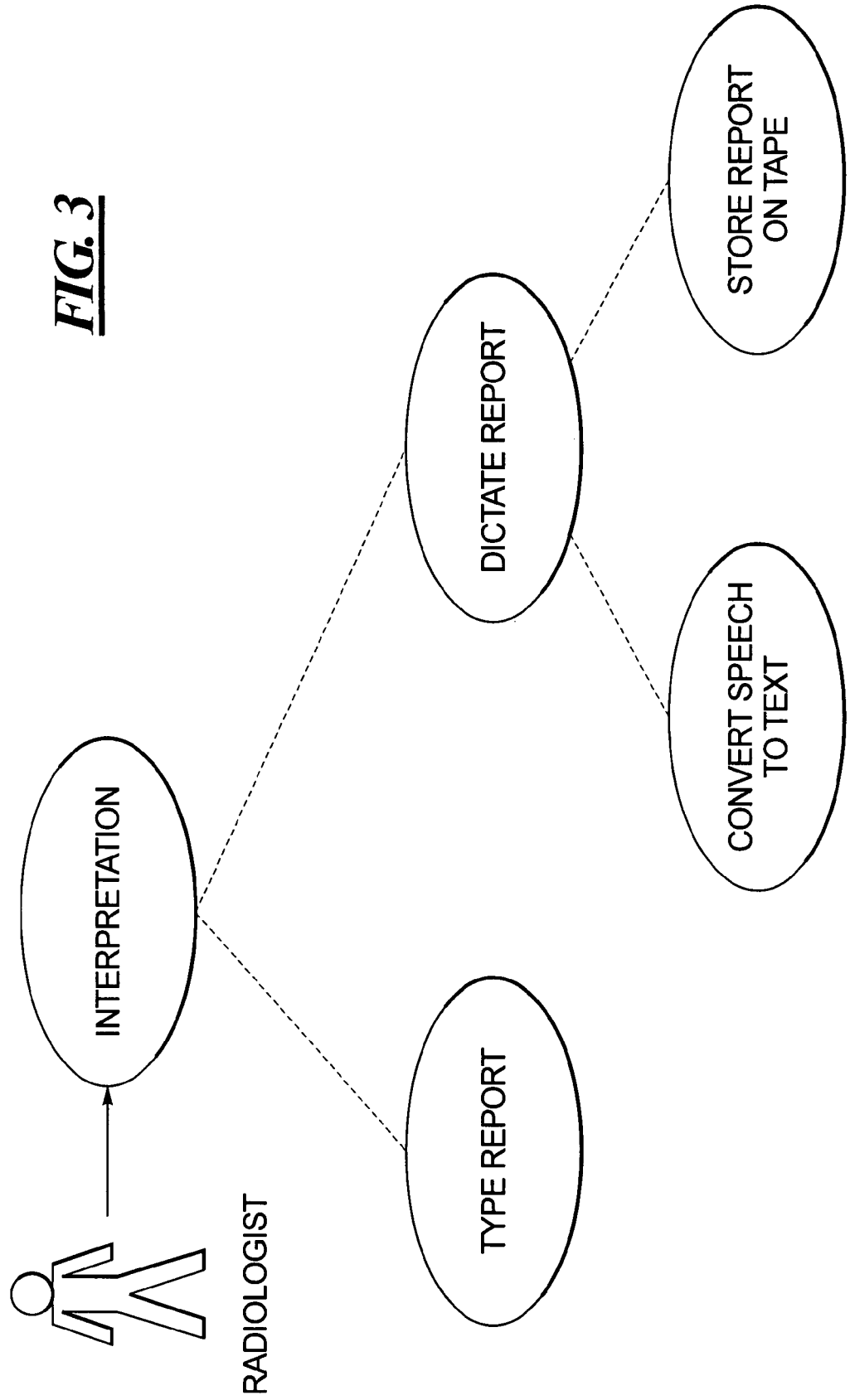
FIG. 3 illustrates an example of the operation of the inventive method in the context of a medical system used by a radiologist.
Figure 4:
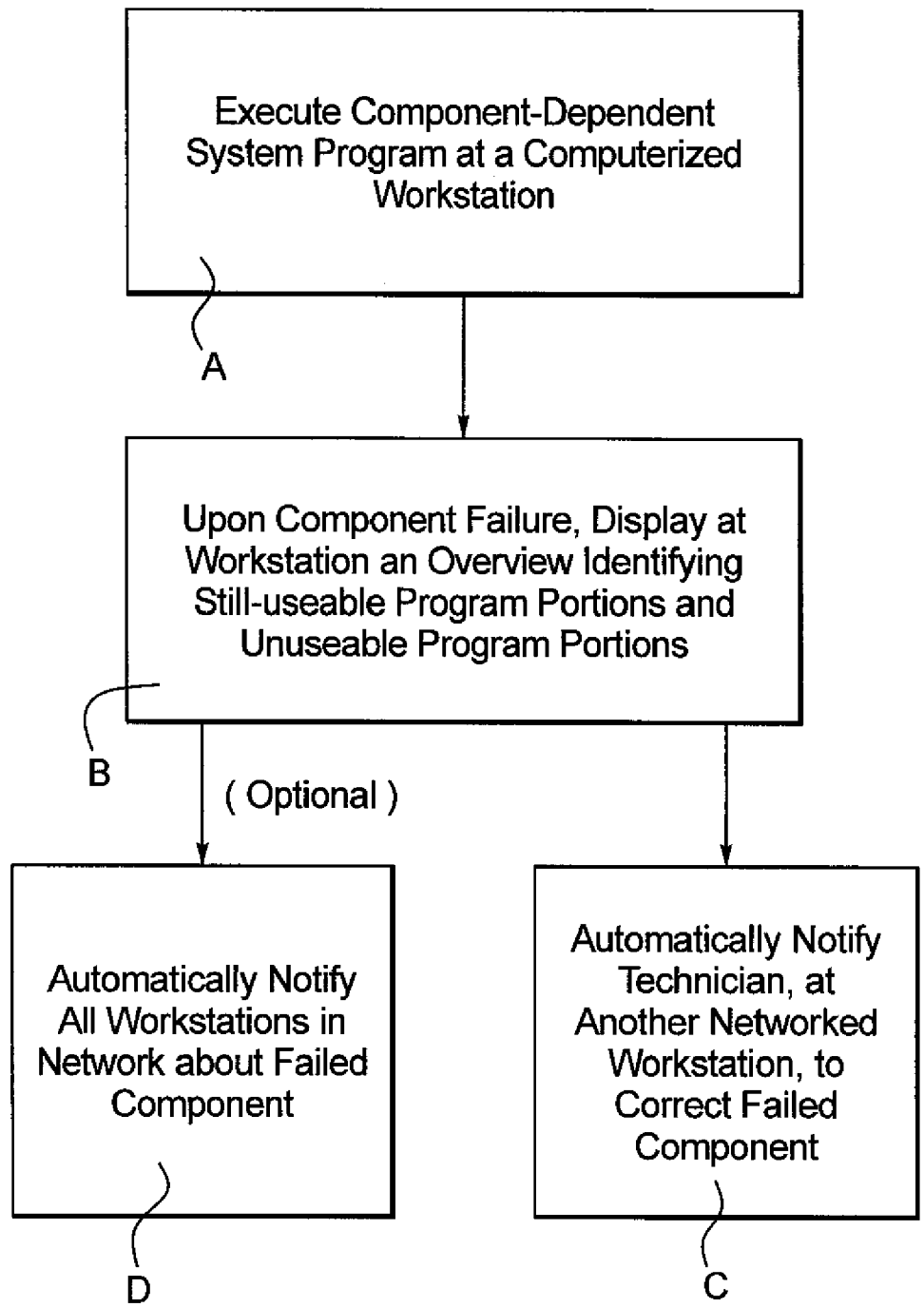
FIG. 4 is a flowchart illustrating an embodiment, including notification of the occurrence of a failed component.

In the example shown in FIG. 3 supported by the flowchart of FIG. 4, a radiologist working at his or her workstation has called up certain radiological information for a patient, such as image data and other text and graphics information, for the purpose of making a diagnostic interpretation (Step A in FIG. 4). As part of the implementation of this interpretation, the radiologist must prepare a report of his or her findings. For this purpose, the radiologist, for example, might wish to make use of an automatic voice recognition program for converting speech to text. Upon calling that program, however, the radiologist is presented with a display as indicated in FIG. 3, wherein an icon or text indicating the "convert speech to text" program is displayed in red, or with some other indication that this particular program is non-functional at the moment. The user can then immediately see that the alternative "type report" is still available and can also see that if the radiologist would still like to dictate the report, the option of "store report on tape" is also still available (Step B in FIG. 4).

This same information can be provided to other users of the system, such as other radiologists, if and when the other radiologists, at their own respective workstations, call the "interpretation" program (Step D in FIG. 4).

Therefore, specific or targeted information regarding the system status is provided to all effected users, with an easily ascertainable representation of "what works, what doesn't" that can be seen at a glance. Moreover, information is distributed on a "need to know" basis. In the example of FIG. 3, the radiologist is informed only about a problem that concerns his or her individual workflow and would not be informed about a problem, for example, concerning the malfunctioning of software distribution.

Moreover, since the same basic information is always displayed to the user, the user is easily able to ascertain the effect of a malfunctioning component, even if details of the underlying architecture change. Additionally, all users are shown the same display, and therefore can communicate with each other as needed on the basis of commonly understood information.

For a service technician, a detailed analysis of the source of the error is still possible, but without effecting the work by other users of the system (Step C in FIG. 4).

Although modifications and changes may be suggested by those of ordinary skill in the art, it is the intention of the inventors to embody within the patent warranted hereon all changes and modifications as reasonably and properly come within the scope of their contribution to the art.

We claim as our invention:

1. A method for responding to errors that occur during operation of a medical system comprising a plurality of computerized workstations in communication with a network, said method comprising the steps of:

at one of said computerized workstations, executing a system program, as a currently running system program that is dependent on proper functioning of a plurality of components, comprising both software components and hardware components, in said system;

upon a malfunction of one of said components, automatically displaying, at said one of said workstations, an overview only of said currently running system program that identifies which portions of said currently running system program are still usable, despite said malfunctioning component, and which portions of said currently running system program are no longer usable due to said malfunctioning component; and automatically notifying, via said network, another of said workstations that is designated as being associated with a technician to correct said malfunctioning component.

2. A method as claimed in claim 1 comprising additionally automatically providing a general notification, via said network, to all of said workstations identifying said malfunctioning component.

3. A method as claimed in claim 1 comprising automatically determining, in said one of said workstations computer, which portions of said currently running system program are still usable and which portions are not usable by analyzing an influence of said malfunctioning component on each of a plurality of individual steps in said currently running system program.

4. A method as claimed in claim 1 comprising automatically determining which portions of said currently running system program are still usable and which portions are not usable by analyzing, in said one of said workstations, a prognosis, for each of a plurality of individual steps of said currently running system program, for correction of said malfunctioning component.

5. A method as claimed in claim 1 comprising, in said one of said workstations, analyzing which portion of said currently running system program is still usable and which portion is not usable by estimating a point in time until failure of another of said components of said currently running system program.

6. A method as claimed in claim 1 comprising, at said one of said workstations, displaying said presentation as a schematic hierarchical tree of said currently running system program, with portions of said currently running system program in said tree that are still operational being presented visibly differently from portions of said currently running system program in said tree that are no longer operational due to said malfunctioning component.

7. A method as claimed in claim 6 comprising displaying the respective portions with different colors.

* * * * *